Inventor,
Joseph J. Coleman,
By: Jones, Darbo & Robertson, Attys.

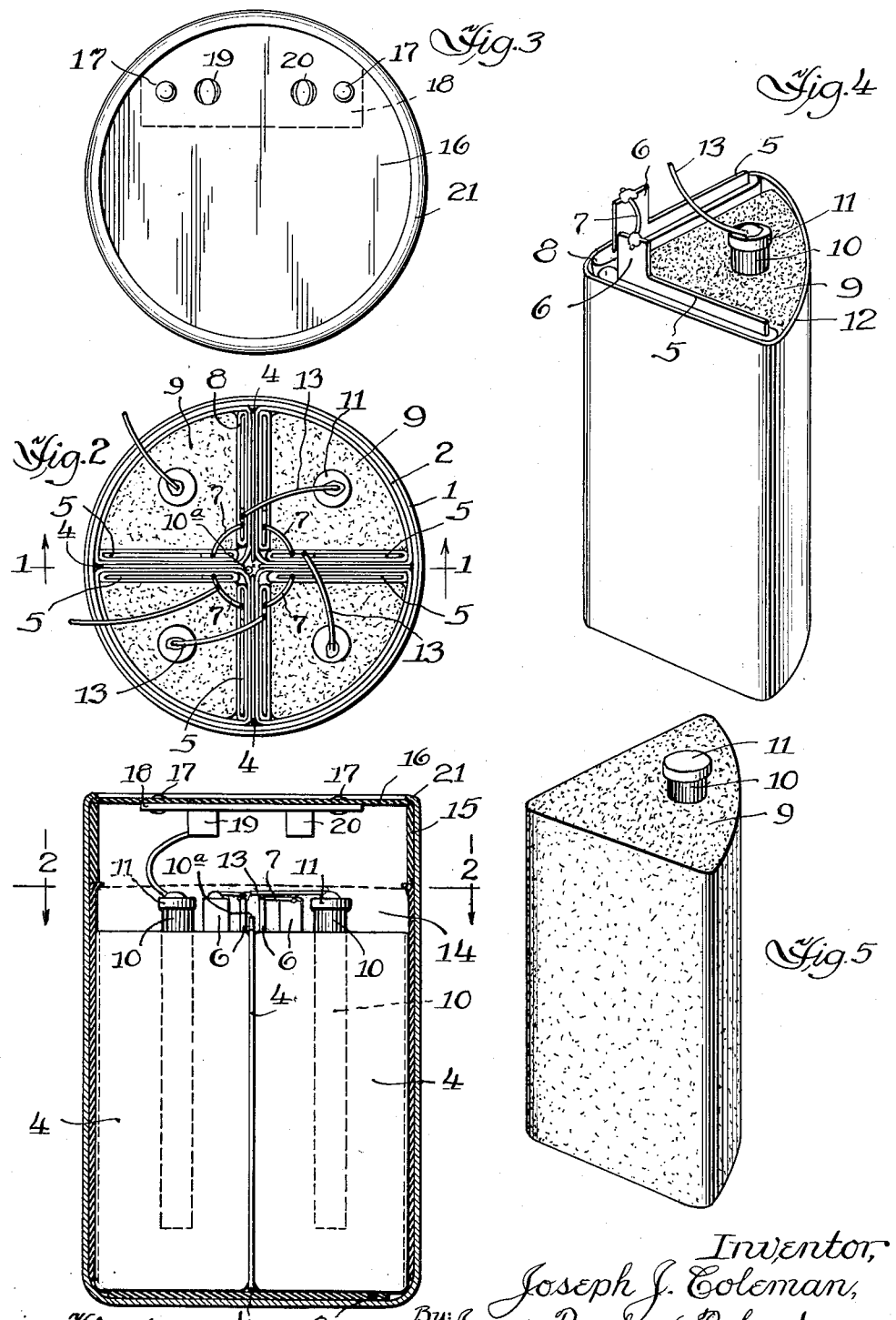

United States Patent Office 3,043,899
Patented July 10, 1962

3,043,899
MAGNESIUM BATTERY
Joseph J. Coleman, Freeport, Ill., assignor to Servel, Inc. (Burgess Battery Company Division), Freeport, Ill., a corporation of Delaware
Filed Feb. 2, 1959, Ser. No. 790,700
7 Claims. (Cl. 136—108)

This invention relates to primary batteries having magnesium anodes and more particularly refers to a multicell magnesium battery which is not subject to swelling and leaking.

Magnesium has long appeared attractive as an anodic material for use in primary electric cells. Among its desirable attributes are high electromotive potential and high energy per unit volume. Its high potential allows fewer cells to be used to achieve the same overall battery potential. For the same unit volume, more active battery material can then be incorporated into each cell, resulting in longer useful cell life. Alternatively, a cell of the same electrical capacity as a comparable zinc cell may be made substantially smaller in size. A second desirable attribute of magnesium is its ability to provide more electrical energy per unit weight, since magnesium, in addition to having a high potential, is one of the lightest of the metals. This makes it ideal for use in such applications as the powering of metereological equipment which is to be carried aloft by balloons, an application where weight becomes an extremely important factor.

Because magnesium is highly reactive, it has placed serious obstacles in the path of its commercial utilization as an anodic material in dry cells. Magnesium tends to react with aqueous electrolytes even when no current is being drawn from the cells. This results in excessive anodic dissolution, with its attendant cell leakage and premature cell exhaustion. Additionally, magnesium salts in large quantity form during discharge and even on standing, resulting in substantial volumetric expansion within the cell, and tending to cause magnesium cans used as cell containers to swell and eventually to crack.

The problem of excessive anodic dissolution has been substantially solved by the use of inhibiting electrolytes, such as, for example, the electrolytes described below for use in the present invention. In order to prevent bulging and leakage, magnesium cans which are used both as the anode and cell container have in the past been made with a greater thickness than that which would be necessary to supply the number of electrochemical equivalents required to equal that of the cathode. However, this method is extremely wasteful of the relatively expensive magnesium metal, and, as a result, these cells have not attained commercial importance. Additionally, the use of thick sidewalled magnesium cans has not always been successful in the prevention of leakage and bulging of the cell, since the strength of magnesium is not as great as that of some of the other metals.

It is an object of this invention to provide a multicell magnesium battery of such structure that it is not subject to cracking or swelling caused by the expansion of the contents of the cells of the battery as a result of the formation of reaction products of discharge.

It is still further an object to provide a multicell battery utilizing magnesium anodes which is not subject to swelling, and wherein the amount of magnesium may be reduced to the point where the anode of each cell contains substantially the same number of electrochemical equivalents as the cathode.

Other objects and advantages of the present invention will become apparent from the description contained below, and the accompanying drawing, in which:

FIG. 1 is a vertical cross section of a magnesium battery according to the present invention taken at the line 1—1 of FIG. 2;

FIG. 2 is a horizontal cross section of the battery taken at the line 2—2 of FIG. 1;

FIG. 3 is a top view of the battery;

FIG. 4 is a perspective view of one of the cells of the battery shown in FIGS. 1–3;

FIG. 5 is a perspective view of the depolarizer core of the cell shown in FIG. 4;

Figure 6:
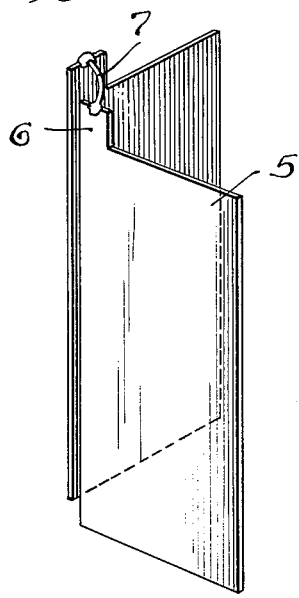
FIG. 6 is a perspective view of the anode arrangement of the same cell.

According to the present invention, a magnesium battery is provided with a cylindrical outer container having a circular cross section and fabricated from a material having sufficient strength to withstand the pressure created in the battery during use, and having sheet form magnesium anodes centrally disposed within the battery. In the preferred form the anodes are disposed radially with respect to the axis of the battery, and may be of either single or multi-element construction.

Referring to FIGS. 1–3 a four cell magnesium battery is shown contained in an aluminum cup 1. Immediately within the cup wall is a cup liner 2 of a material such as duplex paperboard comprising two paper layers having an asphalt layer sandwiched therebetween, and wherein the paper layers are themselves saturated with asphalt. A bottom washer 3 also of saturated duplex paperboard rests on the cup bottom. The four cells are radially arranged within the cup 1 and are separated from each other by cell insulators 4, also of saturated duplex paperboard.

Each individual cell is comprised of a magnesium anode fabricated of two separate plates 5 perpendicularly arranged with respect to each other and having their line of intersection substantially along the axis of the outer container or cup. A tab 6 is provided on each plate for making electrical connection between each pair of plates and between the anode of one cell with the cathode of another cell. The tabs of each pair of plates are connected to each other by a pin wire 7 each of whose ends is welded to one of the tabs.

A bibulous separator 8 of a material such as craft paper is folded about each electrode plate 5. A depolarizer core 9 in the form of a cylindrical sector is positioned with its two flat angular sides contiguous with the separators 8. Each separator 8 is folded about its respective anode plate in such a manner that the complete surface of the plate adjacent to the core and the side and bottom edges are covered by the separator in order to prevent the core material from making contact with the plates. Disposed within each depolarizer core 9 is a carbon rod 10 which functions as a cathode collector. A brass cap 11 is affixed to the upper end of the carbon rod 10 for connecting it with an adjacent cell or with an external circuit.

Each cell is contained in a Pliofilm bag 12 which insulates the cell from every other cell and contains the cell electrolyte to prevent leaking and evaporation.

The cells are connected to one another in series by means of connecting leads 13, one end of which is welded to a tab of the anode of one cell, and the other end of which is soldered to the brass cap 11 of another cell. Alternatively, the cells may be connected in parallel or in series-parallel.

A wax seal 14 formed by pouring a layer of molten wax over the top of the cells seals the cells by forming an airtight enclosure together with each Pliofilm bag 12. Only the outline of the wax seal is shown in FIGS. 1 and 2 in order that the other cell structures may be seen more clearly. Above the wax seal layer is disposed a cylindrical socket support tube 15 of chipboard. Supported on the upper lip of the tube 15 is a socket disc 16 of a suitable material such as fibre or laminated plastic sheet. Affixed to the socket disc 16 by means of eyelets 17 is a terminal plate 18 having positive and negative terminals 19 and 20 mounted thereon. The socket disc 16 is maintained in the position and in pressure relationship against the socket support tube 15 by a crimp 21 in the lip of the outer cup 1.

A vent carbon 10a may be advantageously provided near the axis of the battery and positioned perferably at the corner of the negative-most cell just outside of the Pliofilm bag and at the point where the corners of the two cell insulators come closest together. To be most effective, one end of the vent carbon should protrude into the chamber beneath the wax seal, and the other end should penetrate the wax seal layer and rise into the space between the wax seal layer and the socket disc.

FIGS. 4–6 show in greater detail the structure of a single cell and its components.

Figure 7:
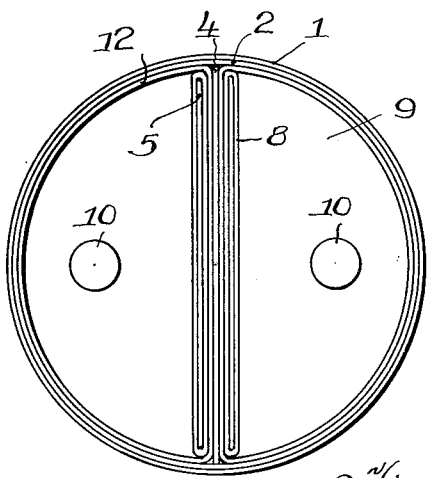
FIG. 7 is a diagrammatic cross section of a battery having two cells.
Figure 8:
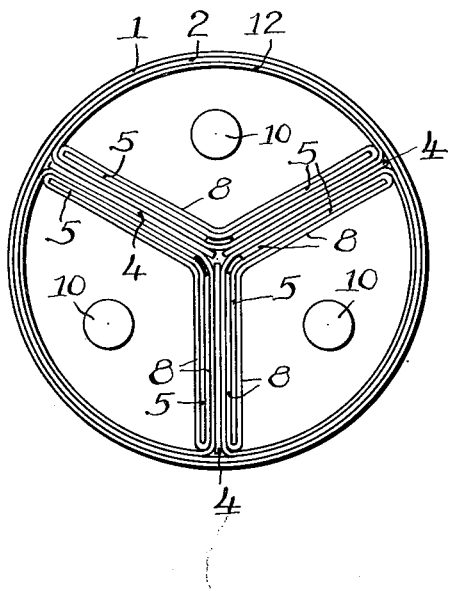
FIG. 8 is a diagrammatic cross section of a battery having three cells.

FIGS. 7 and 8 show configurations which may be used for two cell and three cell batteries. A greater number of cells may also be used. Regardless of the number of cells, the preferred configuration is one where the cells are arranged radially within the battery, such as in the structure shown in FIGS. 1–6. Where lower current drains are to be used, the anode may consist of only a single radius.

The magnesium anodes must be centrally disposed within the battery. As used herein in the specification and claims, the term "centrally disposed" refers to structures such as are shown in the drawings where the anodes are comprised of radii and the depolarizer cores are located between the radii of the anodes and substantially separate the anodes from the outer container of the battery. This arrangement is in contrast to that of batteries and cells where the anodes form the outer container, or else lie next to the outer container. Since there is no dependence upon the anode to contain the contents of the cell, it need not include a greater amount of magnesium than is necessary to match the electrochemical equivalents of the cathode or depolarizer core.

The outer container, whether it be in the form of a can or sleeve, may be preferably fabricated of steel or aluminum. However, other suitable materials having the necessary strength such as other metals which may be drawn or rolled, or even plastic materials, may be used. The outer container should have a circular cross section since it is then less susceptible to distortion because of pressure from within.

The most important features of the present structure which render it commercially practical are the arrangement of the anodes within the battery and the use of a cylindrical separate outer container. Where, in structures of the prior art, the anode has been disposed at the periphery of the cell, the formation of gas and salts during discharge exerts a direct pressure causing the anode to swell, and eventually to rupture. In the present structure the pressure against the anode is directed inwardly, with the result that it has no appreciable unfavorable effect on the anode. Even where the anode may become distorted or perforated, the cell will continue to function.

The anode may be fabricated in one piece or in two or more pieces. Where more than one piece is used, the pieces are electrically connected together. This may be done by a connecting wire, each end of which is welded to one of the pieces of the anode. Where the anode is made up of a single sheet of magensium, the sheet should be bent to the proper angle so the two portions will be disposed as radii at the proper angle to engage both radial surfaces of the depolarizer core. The material used for the anode may be either pure magnesium or any of the magnesium alloys commonly used in primary batteries. The depolarizer is comprised substantially of about 90 parts manganese dioxide and 10 parts of a carbon black such as an acetylene black. However, other carbon blacks or graphite may be used as a substitute. The manganese dioxide and carbon black are mixed together with an aqueous electrolyte to form an extrudible mixture. This mixture may then be extruded through a nozzle having a cross section of the cell cores, and subsequently cut to the desired core lengths. Alternatively an extrusion having a circular cross section may be formed and cut to the desired length. The cylindrical extrusion may then be cut into sections in much the same way as a pie is cut.

A suitable electrolyte for the cell may be comprised of 100 pounds of 41% magnesium bromide, 149 pounds of water and 19 grams of lithium chromate crystals. This results in a solution comprised of 17% magnesium bromide, .017% lithium chromate, and 83.43% water.

Batteries according to the present invention are assembled by first placing the elements of each cell into their respective Pliofilm bag. A cup liner is then inserted in the cylindrical container, and the bottom washer inserted thereinto. The individual cells are then inserted into the container, and cell insulators inserted between the cells. The vent carbon may also be inserted at this time. Suitable electrical connections are then made between the cells and the wax seal poured. After the wax has hardened, first the socket support tube and then the socket disc containing the terminal plate are inserted. Assembly is completed by crimping the outer cup lip over the socket disc.

The present invention has by its unique structure herein disclosed provided a commercially feasible magnesium battery by virtue of its successful solution of the problems which have heretofore relegated the magnesium battery to the laboratory; the technical problems of swelling and cracking, and the economic problems of providing such a battery at a cost sufficiently low to compete with the zinc battery.

Invention is claimed as follows:

1. A magnesium battery comprising a cylindrical outer container of circular cross section composed of a strong rigid sheet material, a plurality of primary cells arranged within said container, each of said cells comprising a sheet-form magnesium anode, a depolarizer core, a bibulous separator disposed between said anode and said depolarizer core, an inert carbon element in contact engagement with said depolarizer core, and a cell enclosure comprised of a nonconductive sheet material, each of said anodes being centrally disposed with respect to said outer container; means for providing electrical connection between said cells, sealing means disposed over the tops of said cells, and terminal means connected to said cells and mounted in said outer container.

2. A magnesium battery comprising a cylindrical outer container of circular cross section composed of sheet metal, a plurality of primary cells arranged within said container, each of said cells comprising a sheet-form magnesium anode, a depolarizer core, a bibulous separator disposed between said anode and said depolarizer core, an inner carbon element in contact engagement with said depolarizer core, and a cell enclosure comprised of a nonconductive film, each of said anodes being centrally disposed and radially arranged with respect to said outer container, and said depolarizer cores being in the form of cylindrical sectors arranged in the angular spaces formed by each of said radial anodes; means for providing electrical connection between said cells, sealing means comprised of a layer of wax disposed over the top of said cells, and terminal means connected to said cells and mounted in said outer container.

3. A magnesium battery comprising a cylindrical outer container of circular cross section composed of sheet metal, a plurality of primary cells arranged within said container, each of said cells comprising a sheet-form magnesium anode, a depolarizer core, a bibulous separator disposed between said anode and said depolarizer core, a carbon element in contact engagement with said depolarizer core, and a cell enclosure comprised of a non-conductive film, each of said anodes being centrally disposed with respect to said outer container and being comprised of a pair of plane sides disposed at an acute angle with respect to each other, the apexes formed by the intersections of each pair of plane sides lying substantially along the axis of the cylindrical outer container, said plane sides being oriented as radii of said cylindrical outer container, said cores being in the form of cylindrical sectors and positioned within the acute angles formed by the plane sides of each of said anodes; means for providing electrical connection among said cells, sealing means comprising a layer of wax disposed over the open tops of said cells, and terminal means connected to said cells and mounted in said outer container.

4. A magnesium battery comprising a cylindrical cup of circular cross section, a plurality of primary cells arranged within said cup, each of said cells comprising a sheet-form magnesium anode, a depolarizer core comprised of manganese dioxide, carbon black, and an aqueous electrolyte, a bibulous separator disposed between said anode and said depolarizer core, a carbon element in contact engagement with said depolarizer core, and a cell enclosure comprised of a non-conductive film, each of said anodes being centrally disposed with respect to said outer container and comprised of a pair of plane sides disposed at an acute angle with respect to each other, the apexes formed by the intersections of each pair of plane sides being substantially along the axis of the cylindrical cup, the plane sides of each of said anodes being oriented as radii of said cylindrical cup, each of said cores being in the form of a cylindrical sector and positioned within the acute angle formed by the plane sides of each of said anodes, means for providing electrical connection among said cells, sealing means comprising a layer of wax disposed over the open tops of said cells, and terminal means connected to said cells and mounted in said outer container.

5. A magnesium battery according to claim 4 wherein said cylindrical cup is comprised of steel.

6. A magnesium battery according to claim 4 wherein said cylindrical cup is comprised of aluminum.

7. A magnesium battery according to claim 4 wherein said cylindrical cup is comprised of a plastic material.

References Cited in the file of this patent

UNITED STATES PATENTS

| | | |
|---|---|---|
| 808,755 | Jager | Jan. 2, 1906 |
| 1,224,376 | Hambuechen | May 1, 1917 |
| 2,605,299 | Teas | July 29, 1952 |
| 2,612,533 | Blake | Sept. 30, 1952 |
| 2,627,532 | Wilke | Feb. 3, 1953 |
| 2,661,388 | Warner et al. | Dec. 1, 1953 |
| 2,807,658 | Halfield | Sept. 24, 1957 |
| 2,859,265 | George | Nov. 4, 1958 |
| 2,900,434 | Zimmerman et al. | Aug. 18, 1959 |